US009475942B2

(12) United States Patent
Lewarchik et al.

(10) Patent No.: US 9,475,942 B2
(45) Date of Patent: Oct. 25, 2016

(54) ALUMINUM PHOSPHATE COMPOSITE MATERIALS AND COMPOSITIONS

(71) Applicant: Bunge Amorphic Solutions LLC, White Plains, NY (US)

(72) Inventors: Ronald James Lewarchik, Brighton, MI (US); Raymond E. Foscante, Yorba Linda, CA (US)

(73) Assignee: BUNGE AMORPHIC SOLUTIONS LLC, White Plains, NY (US)

( * ) Notice: Subject to any disclaimer, the term of this patent is extended or adjusted under 35 U.S.C. 154(b) by 0 days.

(21) Appl. No.: 13/708,810

(22) Filed: Dec. 7, 2012

(65) Prior Publication Data

US 2014/0163151 A1    Jun. 12, 2014

(51) Int. Cl.
| | | |
|---|---|---|
| *C08K 9/02* | (2006.01) | |
| *C09C 1/40* | (2006.01) | |
| *C09C 1/00* | (2006.01) | |
| *C09D 7/12* | (2006.01) | |

(52) U.S. Cl.
CPC .............. *C09C 1/0084* (2013.01); *C08K 9/02* (2013.01); *C09C 1/0081* (2013.01); *C09C 1/40* (2013.01); *C09D 7/1225* (2013.01); *C01P 2004/03* (2013.01); *C01P 2004/61* (2013.01); *C01P 2004/62* (2013.01); *C01P 2004/84* (2013.01); *C01P 2006/60* (2013.01)

(58) Field of Classification Search
CPC .................................. C09C 1/40; C08K 9/02
USPC .......................................... 523/200; 524/417
See application file for complete search history.

(56) References Cited

U.S. PATENT DOCUMENTS

| | | | |
|---|---|---|---|
| 2,222,198 A | 11/1940 | Fleck | |
| 2,668,776 A | 2/1954 | Miller | |
| 3,330,798 A | 7/1967 | Deissmann et al. | |
| 3,726,700 A | 4/1973 | Wildt | |
| 4,814,208 A | 3/1989 | Miyazaki et al. | |
| 4,978,394 A | 12/1990 | Ostertag et al. | |
| 5,248,556 A | 9/1993 | Matijevic et al. | |
| 5,385,753 A | 1/1995 | Hu et al. | |
| 5,702,519 A | 12/1997 | Nitta et al. | |
| 5,942,281 A | 8/1999 | Guez et al. | |
| 5,976,237 A | 11/1999 | Halko et al. | |
| 6,576,052 B1 | 6/2003 | Takahashi et al. | |
| 6,626,989 B1 | 9/2003 | DeLuca, Jr. et al. | |
| 6,648,958 B2 | 11/2003 | Anselmann et al. | |
| 6,818,297 B1 | 11/2004 | Atarashi et al. | |
| 6,991,677 B2 | 1/2006 | Tanabe et al. | |
| 7,264,672 B1 | 9/2007 | Trabzuni et al. | |
| 7,285,328 B2 | 10/2007 | Price et al. | |
| 7,288,146 B1 | 10/2007 | Nicolai et al. | |
| 7,438,881 B2 * | 10/2008 | Staffel et al. ................. | 423/311 |
| 7,604,862 B2 | 10/2009 | Ambrosius et al. | |
| 7,713,349 B2 | 5/2010 | Hung et al. | |
| 7,763,359 B2 | 7/2010 | Galembeck et al. | |
| 7,828,890 B2 | 11/2010 | Henglein et al. | |
| 7,842,131 B2 | 11/2010 | Blumel et al. | |
| 7,951,309 B2 | 5/2011 | Galembeck et al. | |
| 8,039,183 B2 | 10/2011 | Veregin et al. | |
| 8,221,834 B2 | 7/2012 | Hua et al. | |
| 2004/0007159 A1 | 1/2004 | Katsuta | |
| 2004/0180010 A1 | 9/2004 | Andes et al. | |
| 2005/0061205 A1 | 3/2005 | Kobayashi et al. | |
| 2006/0045831 A1 | 3/2006 | Galembeck et al. | |
| 2006/0078485 A1 | 4/2006 | Thiele et al. | |
| 2006/0275606 A1 | 12/2006 | Mizutani | |
| 2007/0175363 A1 | 8/2007 | Blumel | |
| 2008/0044366 A1 | 2/2008 | Dumousseaux | |
| 2009/0217841 A1 | 9/2009 | Galembeck et al. | |
| 2009/0258251 A1 | 10/2009 | Abe et al. | |
| 2010/0083872 A1 | 4/2010 | Kitamura et al. | |
| 2010/0178308 A1 | 7/2010 | Iwasa et al. | |
| 2010/0179265 A1 | 7/2010 | Galembeck et al. | |
| 2010/0180801 A1 | 7/2010 | Thauern et al. | |
| 2010/0203093 A1 | 8/2010 | Bujard et al. | |
| 2010/0203318 A1 | 8/2010 | Galembeck et al. | |
| 2010/0292382 A1 | 11/2010 | Galembeck et al. | |
| 2011/0070273 A1 | 3/2011 | Zheng | |
| 2011/0251304 A1 | 10/2011 | Brown | |

(Continued)

FOREIGN PATENT DOCUMENTS

| | | |
|---|---|---|
| WO | 2008017135 A1 | 2/2008 |
| WO | 2014089512 A1 | 6/2014 |

OTHER PUBLICATIONS

International Search Report and Written Opinion dated Feb. 20, 2014 for corresponding International Application No. PCT/US2013/073716 filed Dec. 6, 2013; total 12 pages.

(Continued)

*Primary Examiner* — Vickey Nerangis

(74) *Attorney, Agent, or Firm* — Grant T. Langton; Snell & Wilmer L.L.P.

(57) ABSTRACT

AlP composite materials comprise an AlP aggregate core, and a shell disposed partially or entirely over the core and formed from a pigment material, e.g., $TiO_2$, having an index of refraction greater than the core, providing an overall index or refraction greater than the core and suited for use as a pigment replacement or extender. The AlP core comprises amorphous AlP, crystalline AlP, or a combination thereof, and can have an average particle size of less than about 30 microns. The $TiO_2$ can have an average grain size less than about 10 microns. The shell can have a layer thickness that is at least about 0.0001 microns. The shell is bonded to the core by a reaction between functional groups of the shell and core. The AlP composite material can be engineered to provide properties in addition to brightness for use as a pigment such as anticorrosion and/or antimicrobial protection.

34 Claims, 1 Drawing Sheet

(56) References Cited

U.S. PATENT DOCUMENTS

2011/0301272 A1   12/2011   Galembeck et al.
2012/0091397 A1    4/2012   Foscante
2015/0183996 A1*   7/2015   Rose et al. .................. 427/180

OTHER PUBLICATIONS

International Preliminary Report on Patentability dated Jun. 9, 2015 for corresponding International Application No. PCT/US2013/073716 filed Dec. 6, 2013; total 9 pages.

* cited by examiner

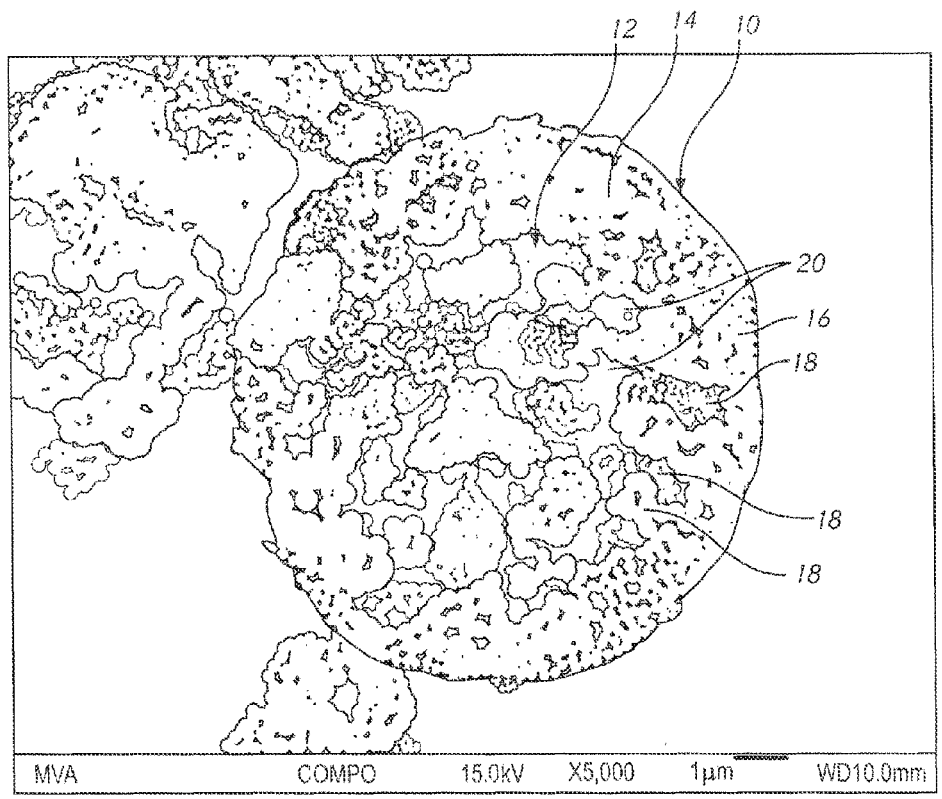

ALUMINUM PHOSPHATE COMPOSITE MATERIALS AND COMPOSITIONS

FIELD

Aluminum phosphate composite materials and compositions comprising the same are disclosed herein that are engineered to provide properties making them useful as a pigment replacement and/or pigment extender, e.g., for use in place of conventional pigments such as $TiO_2$ and the like, and that can provide additional properties not otherwise present with such conventional pigments.

BACKGROUND

The use of conventional pigments such as $TiO_2$ and the like in coating formulations is well known. $TiO_2$ pigments are the widest used pigments in the coatings industry, as they are used in virtually all white or pastel coating compositions because of its brightness and very high refractive index (having an index of refraction of about 2.61). While such conventional $TiO_2$ pigments are useful for providing a desired level of brightness and high refractive index in coating formulations, the raw material cost of conventional $TiO_2$ has increased over the years, reducing the profit margin obtainable for chemical formulations or coating products containing the same if the raw material cost increase cannot be passed onto the product consumer.

Also, while $TiO_2$ is useful for providing a desired degree of brightness, it alone is not useful for introducing one or more other performance properties that may be desired into a particular chemical or coating formulation. Accordingly, chemical or coating formulations calling for performance properties in addition to brightness conventionally rely on additives or agents in addition to $TiO_2$, thereby adding further to the cost and/or complexity of formulating the chemical composition or coating.

It is, therefore, desired that a composite material be developed in a manner that provides pigment performance characteristics, e.g., brightness and high refractive index, that are the same as or similar to that of conventional pigments such as $TiO_2$, e.g., to serve as a primary pigment replacement or as a pigment extender, and that is more cost efficient when compared to conventional $TiO_2$ from either a raw material and/or a formulated coating cost per unit volume solids. It is also desired that the composite material be one that is capable of providing one or more performance properties in addition to brightness to enable making chemical or coating formulations calling for such additional performance properties without having to rely on additional additives or agents.

SUMMARY

Aluminum phosphate composite materials as disclosed herein comprise a core and shell structure, wherein the shell is formed from a material having an index of refraction that is higher than the core to provide an the composite material with an overall index of refraction that is greater than the core, and wherein the core is formed from a material having a reduced material cost when compared to the shell. In an example, the core comprises an aggregate of joined-together primary aluminum phosphate grains or powder, and the aggregate is hereby referred to an AlP particle. The AlP particle can comprise amorphous AlP, crystalline AlP, or a combination thereof. The AlP particle can have an average particle size of less than about 30 microns, in the range of from about 3 to 20 microns, and preferably in the range of from about 5 to 10 microns. The AlP can be made by precipitation, binary condensation, and sol gel methods of making.

In such example, the shell is provided in the form of a layer of pigment material disposed over an outside surface of the core. A preferred pigment material is $TiO_2$. The $TiO_2$ can have an average grain or powder size that is less than about 10 microns, in the range of from about 0.1 to 5 microns, and preferably in the range of from about 0.3 to 1 microns. The shell has a layer thickness that is at least about 0.0001 microns, and between about 0.001 to 2 microns, and preferably in the range of from about 0.01 to 1 microns. Generally, the shell layer thickness can comprise as little as a single grain, or can comprise several grains that are bonded or otherwise combined together on the core surface.

The shell may cover all or only a portion of the AlP core. In an example, the shell covers at least 20 percent of the total outside surface of the core, in the range of from about 30 to 100 percent of the total outside surface of the core, and preferably 20 percent of the core outside surface, and preferably in the range of from about 50 to 75 of the core outside surface. In an example, the $TiO_2$ is treated with or otherwise comprises a material that reacts with pendant POH groups from the AlP core to form a reaction product therebetween that operates to bond the shell to the core.

If desired, the AlP composite material can be engineered to provide properties in addition to being a pigment and/or pigment extender. In an example, the AlP composite can produce a controlled release of phosphate anion when placed into contact with moisture to provide a desired degree of anticorrosion protection. Additionally, the AlP composite material can be engineered to produce a controlled release of one or more other elements or compounds useful for providing anticorrosion, and/or for providing other properties such as antimicrobial and/or antifouling protection.

AlP composite materials as disclosed herein can be used as the sole pigment in a chemical or coating composition, e.g., comprising a binding polymer. In an example, the AlP can be used to replace about 100 percent of conventional pigment material. In another example, AlP composite materials as disclosed herein can be used in conjunction with conventional pigments to offset the amount, and thereby the cost, of such other conventional pigment that is used, and can comprise at least about 5 percent by weight of the total pigment used in a formulation, in the range of from about 10 to 80 percent by weight of the total pigment used, and in the range of from about 20 to 60 percent by weight of the total pigment used in a chemical or coating formulation. AlP composite materials as disclosed herein present a more cost-effective option than conventional pigment materials such as $TiO_2$ from either a raw material and/or a formulated coating cost per unit volume solids. Additionally, such AlP composite material are capable of being engineered to introduce one or more other performance property, in addition to brightness, to enable making chemical or coating formulations calling for such additional performance properties without having to rely on additional additives or agents.

DESCRIPTION OF THE DRAWING

These and other features and advantages of aluminum phosphate composite materials and compositions and methods for making the same as disclosed herein will be appreciated as the same becomes better understood by reference to the following detailed description when considered in connection with FIG. 1, which is a photomicrograph showing a cross-sectional view of an example aluminum phosphate composite material as disclosed herein.

DETAILED DESCRIPTION

Aluminum phosphate composite materials and compositions comprising the same as disclosed herein generally comprise a two-component structure made up of a centrally oriented core, and a shell disposed around or over all or part of the core. In an example, the core is formed from a non-$TiO_2$ material such as aluminum phosphate that provides a cost advantage when compared to a core formed entirely from $TiO_2$. In an example, the shell that is disposed over the core is comprised of one or more layers of a conventional pigment material, i.e., a material having a high index of refraction such as $TiO_2$. Thus, an advantage of such composite material is that it has a desired high index of refraction (approaching that of conventional solid $TiO_2$), provided by the $TiO_2$ shell, and provides such desired property at a reduced cost (when compared to conventional solid $TiO_2$), by using a different core material that is relatively less costly than $TiO_2$. Additionally, aluminum phosphate composite materials as disclosed herein can be engineered to provide one or more additional performance properties. For example, aluminum phosphate composite materials can be engineered to additionally provide a desired degree of corrosion resistance and/or to provide a desired degree of antimicrobial protection depending on the particular end-use coating or formulation application. This is in addition to serving as a conventional pigment replacement and/or pigment extender.

An example core material useful for forming composite materials as disclosed herein is solid aluminum phosphate (AlP), which may be used in amorphous form, crystalline form, or a combination thereof. The AlP can be formed having a desired particle size during the chemical synthesis process, or can be sized after a chemical synthesis process by conventional sizing techniques. In an example, the AlP particle has an average particle size of less than about 30 microns, in the range of from about 3 to 20 microns, and preferably in the range of from about 5 to 10 microns. Ultimately, the end-use application will influence the particular size of the AlP particle and/or AlP particle distribution that is used for the core. Generally, the majority of coatings are medium and low gloss, and an average pigment particle size much over about 10 microns may end-use applications to those where a low degree of gloss is desired The term "particle" as used herein with respect to the AlP core is understood to mean an aggregate of a number of smaller AlP primary grains or powder that have joined or aggregated together during the process of synthesizing the AlP. The exact number of smaller AlP primary grains or powder that combine to form each ALP particle or aggregate useful for forming the core can and will vary. Accordingly, it is to be understood that the core component of the composite material comprises an AlP aggregate formed from a plurality of primary AlP grains or powder as described above.

The AlP core material is preferably substantially irregular in shape, but can have a shape that is spherical, flat, or needle like if called for by a particular end-use application. For example, it may be desirable in certain applications to have composite material that has a high aspect ratio, or that is flat like a flake or the like. Accordingly, it is to be understood that the core material as disclosed herein can be engineered having a variety of different shapes as called for by a particular end-use application.

An example shell material useful for forming composite materials as disclosed herein is one having an index of refraction that is greater than that of the core material (e.g., AlP has an index of refraction of less than about 1.55), so as to make the resulting composite material suitable to serve as a replacement and/or extender of conventional pigment. In an example, it is desired that the shell material have an index of refraction that is greater than about 1.55, greater than about 1.7, and preferably greater than about 2. In a preferred embodiment, the shell material is formed from $TiO_2$, which has an index of refraction of about 2.6. In a particularly preferred embodiment, the $TiO_2$ is one that has been surface treated with alumina, and/or silica or a combination of alumina and silica, or the like, e.g., rutile grade $TiO_2$, to enhance both light stability and pigment dispersibility. Alternatively, the $TiO_2$ can be treated with any other material that may be reactive with pendant POH groups of the AlP core to thereby adhere to and form a shell with the AlP core.

$TiO_2$ useful for forming the shell of the composite material has an average grain or powder size that is less than about 10 microns, in the range of from about 0.1 to 5 microns, and preferably in the range of from about 0.3 to 1 microns. In certain end-use applications a desired $TiO_2$ particle size for opacity is about 0.3 microns. Thus, using a $TiO_2$ particle size greater or less than 0.3 microns may not provide a level or degree of opacity for certain end-use applications.

In an example embodiment, the $TiO_2$ is placed into contact with the AlP particles or cores, and is attached to the surface of the AlP cores to by reaction between the core and the $TiO_2$ as better described below. Thus, in an example embodiment, AlP composite materials as disclosed herein comprise a reaction product interposed between the core and the shell that operates to bond the shell to the core. In an example, the $TiO_2$ shell can have an average thickness of at least 0.0001 microns, in the range of from about 0.001 to 2 microns, and preferably in the range of from about 0.01 to 1 microns. Generally, the $TiO_2$ shell or layer is formed having a thickness sufficient to provide a desired degree of brightness or index of refraction for a particular end-use application without using excess $TiO_2$ material that would unnecessarily add to the raw material cost of the composite material. The TiO2 shell may have a thickness that may or may not be uniform along the core. Thus, the shell thicknesses provided above are representative of an average taken along different portions of the core surface.

The $TiO_2$ shell can cover the entire outside surface of the core material, i.e., it can encapsulate the core, or can cover a partial region or portion of the core outside surface. The extent of shell coverage over the core surface depends on such factors as whether the composite material is being used as the primary formulation pigment, whether it is being used as an extender pigment in conjunction with another pigment material, the desired degree of brightness desired for the particular end-use application, the particular material used to form the core, and particular material selected to use the shell, and the like.

In an example, where the core is AlP and the shell is $TiO_2$, it is desired that the $TiO_2$ shell cover a portion of the core surface sufficient to provide a degree of brightness or index of refraction sufficient to act as a primary or extender pigment. In such example, the $TiO_2$ shell covers at least about 20 percent of the core outside surface, in the range of from about 30 to 100 percent, and preferably in the range of from about 50 to 75 percent of the core outside surface. The exact degree of $TiO_2$ shell coverage as noted above can and will vary depending on the particular end-use application. Additionally, the amount of shell coverage can vary depending on the particular shell material that is used, e.g., if the shell material is a material other than $TiO_2$. For example, for shell materials having an index of refraction that is less than $TiO_2$, a higher degree of coverage may be useful to obtain a degree of brightness for the composite material than that achieved using $TiO_2$.

FIG. 1 is a photomicrograph of an aluminum phosphate composite material as disclosed herein. Specifically, this FIGURE illustrates a cross-section of an aluminum phosphate composite 10 comprising a AlP core 12 in the form of an AlP particle or aggregate 14, and a $TiO_2$ shell 16 disposed over an outside surface 16 of the AlP core 12. As illustrated, the shell 16 may comprise a single $TiO_2$ particle or may comprise a number of $TiO_2$ particles that are combined with one another. In the example, the shell has a thickness that varies along the core surface. As illustrated, the AlP core comprises an aggregate of a number of smaller primary AlP particles 18 that are bonded with one another. The particle or aggregate 14 may include a plurality of open interstitial regions 20 that exist between the primary AlP particles. These interstitial regions can be empty or may include one or more desired materials disposed therein. In the example illustrated in FIG. 1, some of the interstitial regions are shown to include $TiO_2$ disposed therein.

The $TiO_2$ can be introduced into the AlP particle during the process of combining the AlP cores with the $TiO_2$ material. Alternatively, the $TiO_2$ may be introduced into the interstitial regions when the AlP composite material is sized, which operation may cause some of the cores to be opened up and thereby exposing the interstitial regions to any free $TiO_2$ that may be present. Besides or in addition to $TiO_2$, the AlP core can be treated to include one or more other materials disposed within the interstitial regions as called for or desired by the particular end-use application, wherein such other material can operate to introduce a particular performance property or characteristic.

For end-use applications calling for a certain degree of corrosion resistance, it may be desired to leave a portion of the underlying AlP core exposed. AlP as disclosed herein is a corrosion inhibiting material, capable of releasing passivating phosphate anion when placed into contact with moisture that operates to inhibit corrosion of metallic substrates. AlPs useful in this regard include those made in accordance with the references disclosed below and incorporated herein. Thus, a feature of AlPs as used herein as the core is that they can provide a controlled delivery of phosphate anions, of about 50 to 1,500 ppm, when contacted with moisture.

In addition to the corrosion inhibition mechanism of controlled phosphate anion release, such AlPs used as the core are capable of absorbing up to about 25 percent by weight moisture that they come into contact with. Thus, when present for example in the form of a cured film, such AlP core materials function as a sort of sponge to absorb and thus contain moisture entering the film, and thereby operate to prevent such moisture from traveling further through the film to an underlying metallic substrate where it can cause the substrate to corrode. This is in addition to the AlP forming a corrosion inhibiting passivating film on the metallic substrate by reaction of the released phosphate anion and the metallic substrate. Further, in addition to phosphate anion release, AlPs as disclosed herein can be engineered to include one or more other materials useful for providing anticorrosion resistance, examples of which include and are not limited to zinc, calcium, strontium, chromate, borate, barium, magnesium, molybdenum, and combinations thereof.

The AlP core material can be formed according to a variety of different processes and methods, including those disclosed in US Patent Application Publication Nos. 2006/0045831, 2009/0217481, 2010/0203318, 2012/0091397, 2012/0094128, 2012/0094130, and U.S. Pat. Nos. 7,763,359 and 7,951,309, each of which is incorporated herein by reference in its entirety. Additionally, AlP core materials formed according to the references disclosed above can have the same properties of those AlP disclosed in the same references, as again incorporated herein by reference.

AlP core materials are generally formed by combining an aluminum source with a phosphate source, in desired proportions, under desired pH conditions, and under desired conditions of temperature, to result in the formation comprising solid AlP particles. As disclosed in the references disclosed and incorporated herein above, the AlP particles can be formed by precipitation methods, binary condensation, and sol gel methods.

Generally, the precipitation method of making AlP involves combining a suitable aluminum source such as aluminum sulfate or sodium aluminate with a suitable phosphate source such as phosphoric acid using desired aluminum and phosphate ratios, and using desired pH and/or temperature conditions to form AlP. The binary condensation method of making AlP involves combining a suitable aluminum source such as aluminum hydroxide with a suitable phosphate source such as phosphoric acid using desired aluminum and phosphate ratios, adding acid to base or base to acid, wherein acidic aluminum phosphate may be formed as an intermediate, and using desired pH and/or temperature conditions to form AlP. The sol gel method of making AlP involves combining an aluminum salt such as aluminum nitrate with phosphoric acid and adding to the mixture sufficient ammonium hydroxide sufficient to form an aggregate of colloidal AlP forming a gel having a three-dimensional structure of linked amorphous aluminum phosphate particles.

Still further, AlP materials useful as the core of the composite material as disclosed herein can be engineered to incorporate one or more ingredients other than phosphate therein for controlled release to provide certain desired chemical composition or coating performance. For example, AlP materials useful as the core can be synthesized to incorporate one or more active material therein, such as Ag, Cu, Zn, Ca, Ni, Sr, and combinations thereof that may be useful to provide such performance features as antimicrobial protection, to provide conductivity and/or antifouling resistance or the like.

AlP materials as used herein may also comprise organic materials (volatile or nonvolatile, fugitive or nonfugitive) for a variety of reasons. For example, the inclusion of volatile materials may be incorporated to control pore volume, pore size, structure etc., (these materials could be volatilized with heat or vacuum as part of the manufacturing process). Fugitive active organic materials may be used to enhance antimicrobial resistance, enhance conductivity or antifouling properties, act as an antioxidant, and/or provide light stabilization or enhanced UV light stability for example. Nonfugitive organic moieties may be employed to provide functionality for additional modification with other reactive ingredients.

In an example, where antimicrobial protection is desired, the AlP material can be formed by one or more of the same methods described above, in the references incorporated herein, by either combining the desired active material with the AlP after the AlP has been formed, or by combining the desired active material at the time of synthesizing the AlP, to thereby form an AlP complex comprising the active material incorporated into the AlP material. In an example, where the active material is Ag, the resulting AlP material or complex that is formed has a controlled Ag release when in a cured film of about 5 to 1,000 ppm, which is sufficient to provide a desired level or antimicrobial protection on the surface of the film.

For end-use applications calling for one or more of such additional performance features, it is desired that some portion of the underlying AlP core remain exposed and not covered by the shell to thereby enable the AlP core to function in the manner disclosed above to provide desired release of one or more of its constituents, and/or to provide for moisture absorption. Thus, in such applications wherein the AlP core is engineered to provide multiple functions (as a core for the shell and as a carrier for constituent release) in the formulation, the degree of AlP core coverage by the shell represents a compromise between the amount useful to provide a desired level of pigment performance as a replacement or extender and the amount useful to provide a desired release of an AlP constituent content. It is, therefore, to be understood that such shell coverage amounts can vary depending on such factors as the particular end-use application, the type of active ingredient contained in the AlP core, the type of material used to form the shell, and the like.

Composite materials and methods of making the same as disclosed herein may be better understood with reference to the following particular example.

Example

Formation of Composite Material

An example composite material is prepared by combining an aluminum source with a phosphate source in a waterborne system (to form a slurry comprising AlP particles with pendent POH groups) and adding $TiO_2$ (so the POH groups can be reacted with alumina surface treatment of the $TiO_2$) to the slurry to form a shell over the AlP particles. In an example, the aluminum source is aluminum trihydroxide (ATH) and the phosphate source is orthophosphoric acid.

Dispersions of ATH and $TiO_2$

ATH was dispersed in deionized water in a container comprising a high speed dispenser with a cowles blade. In an example, an ATH particle size of less than about 5 microns was desired. The high speed dispenser was used to achieve a 7.5+ Hegman gauge value, which occurred in about 90 to 120 minutes depending on the solid content and total batch size. The average solid content of the ATH dispersion as determined according to ASTM D-2369 was from about 25 to 30 percent. A dispersion of $TiO_2$ was formed by combining $TiO_2$ with deionized water and using a high speed dispenser with cowles blade until a 7.5+ Hegman value was achieved, which was within about 90 to 120 minutes. The solid content of the TiO2 dispersion as determined according to ASTM D-2369 was from about 55 to 65 percent.

Synthesis of AlP

On solid base, one mole of the ATH solution prepared above was added into a reaction kettle along with an amount of deionized water. The reaction kettle included a mechanical stirrer, a heating mantle, a temperature controller, a thermocouple, a condenser, and an addition funnel containing one mole orthophosphoric acid on solid base (ATH to acid mole ratio set at approximately 1:1). The ATH and water solution was initially stirred at about 700 to 1,000 RPM, or in a way that splashing of solution did not occur within the reaction kettle. An initial reaction temperature was set at approximately 42° C., and at this temperature addition of the orthophosphoric acid was started. The addition time for the acid was between about 19 to 21 minutes. After the acid was completely added the stirring speed was increased to a maximum point and the reaction temperature was increased to approximately 92° C. At this condition, reaction was continued for a further 3 hours forming AlP particles. The pH was monitored every hour. Normally, the pH stabilizes within about 3 hours. In general, the pH achieved within this time (initial/stabilized pH) was about 3 to 3.8. The solids content of AlP particles in the batch at this stage was approximately 20.26 percent. The AlP particles in the batch comprised pendent POH groups.

Synthesis of Core-Shell Structure

Once the initial pH was achieved, an amount of the $TiO_2$ solution prepared above was added to the reaction kettle, and stirring was continued for a further 90 minutes. The pH stabilized within this 90 minute time, and was in the range of about 3.5 to 4.6. During this time, the pendent POH groups from the AlP particles reacted with the alumina surface treatment on the $TiO_2$ causing the $TiO_2$ to be strongly attached to the outer surface of the AlP particles, thereby forming a $TiO_2$ shell around each AlP particle or core. At this stage the solids content of the batch was approximately 22.196 percent.

Reacting with Imidazole

An amount of imidazole was added to the reaction kettle. The amount of the imidazole used depended on the total solids combined above, i.e., the ATH, orthophosphoric acid, and $TiO_2$. Depending on the pH achieved after the $TiO_2$ solution was added to the AlP, the amount of imidazole used in the system can vary between about 0.2325 percent to 2 percent to achieve a 5+ final product pH. The imidazole is used to react with any residual POH groups to increase pH, and to improve wet adhesion to ease dispersion of the resulting AlP composite material into the coating formulation.

Filtration, Washing and Drying

The final product was filtered using a Buckner funnel, and the filtered product was washed with deionized water. The deionized water amount was approximately 3.6 times the weight of the total solids of the batch. The washed product was dried at 110° C. under 26 in., Hg vacuum for a period of approximately 24 hours. The final product was stored in a metal container and consisted of the AlP composite material as disclosed herein, and had a d50 particle diameter of approximately 10 microns.

AlP composite materials as disclosed herein are specifically engineered to provide a high index of refraction that is greater than that of the core and relatively closer to that of the shell material, e.g., $TiO_2$, for the purpose of entirely or partially replacing the amount of conventional pigment material used in chemical or coating formulation, and provide such features at a cost that is less than conventional solid $TiO_2$. Accordingly, the use of AlP composite materials as disclosed herein operate to provide desired level of brightness at a reduced price, which price reduction depends on the amount of the AlP composite used to replace conventional solid $TiO_2$.

In certain end-use applications, AlP composite materials as discussed herein can be used to replace up to about 100 percent of conventional pigment material. In example embodiments, AlP composite materials as disclosed herein can be used in conjunction with conventional pigments to offset the amount, and thereby the cost, of such other conventional pigment that is used, and can comprise at least about 5 percent by weight of the total pigment used in a formulation, in the range of from about 10 to 80 percent by weight of the total pigment used, and in the range of from about 20 to 60 percent by weight of the total pigment used in a chemical or coating formulation.

For example a 50/50 blend of conventional solid $TiO_2$ with the AlP composite material as disclosed herein that comprises 15 percent $TiO_2$ present as the shell component of the composite provides a coating composition having a contrast ratio, whiteness and opacity that is comparable to that of a coating composition containing 100 percent conventional solid $TiO_2$. This example 50/50 blend provides a 35 percent reduction in the amount of total $TiO_2$, thereby providing an associated savings in raw material price.

AlP composite materials as disclosed herein can be used in conjunction with both solvent and water-based coating systems, e.g., comprising solvent and/or water-based binding polymers, to provide a desired level of conventional pigment reduction. Examples of such binging polymers include polyurethanes, polyesters, solvent-based epoxies, solventless epoxies, water-borne epoxies, epoxy copolymers, acrylics, acrylic copolymers, silicones, silicone copolymers, polysiloxanes, polysiloxane copolymers, alkyds and combinations thereof Additionally, AlP composites materials as disclosed herein can be used for purposes other than as a pigment, e.g., they can be used as flatteners in coating compositions, this in addition to the additional uses disclosed above, e.g., to provide anticorrosion and/or antimicrobial resistance. Further, the pendent reactive POH groups of the AlP core can be used to attach other elements, ingredients, compounds, inorganic or organic moieties (in addition to or in place of the pigment material) that can provide certain other desired properties to the composite.

AlP composite materials as disclosed above provide a novel pigment replacement and/or pigment extender that may provide additional properties. While such AlP composite materials have been the invention has been described with respect to a limited number of embodiments, the specific features of one embodiment should not be attributed to other embodiments of AlP composite materials as disclosed herein. No single embodiment is representative of all aspects of AlP composite materials as disclosed herein. Variations and modifications from the AlP composite materials described herein exist. The method of making AlP composite materials is described as comprising a number of acts or steps by reference or otherwise. These steps or acts may be practiced in any sequence or order unless otherwise indicated. Finally, any number disclosed herein should be construed to mean approximate, regardless of whether the word "about" or "approximately" is used in describing the number. The appended claims intend to cover all those modifications and variations as falling within the scope of AlP composite materials as disclosed herein.

What is claimed is:

1. A chemical composition comprising:
   an aluminum phosphate composite material comprising:
   a core particle comprising an aggregation of bonded together amorphous aluminum phosphate grains extending throughout the core particle, the core particle occupying a central region of the composite; and
   a layer of material different from the core disposed over an outside surface of the core particle and forming a shell over at least a portion of the core particle, the shell occupying an outer region of the composite;
   wherein the composite material comprises a chemical reaction product formed between POH groups of the core and a material of the shell bonding the core and shell together;
   a binding polymer, wherein the aluminum phosphate composite material is in the form of particles dispersed within the binding polymer.

2. The chemical composition as recited in claim 1 wherein the core particle comprises crystalline aluminum phosphate.

3. The chemical composition as recited in claim 1 wherein the different material has an index of refraction that is greater than the core.

4. The chemical composition as recited in claim 3 wherein the different material is $TiO_2$.

5. The chemical composition as recited in claim 1 wherein the different material has a layer thickness of at least about 0.01 microns.

6. The chemical composition as recited in claim 1 wherein the different material has a layer thickness of from about 0.001 to 2 microns.

7. The chemical composition as recited in claim 1 wherein the shell covers at least 20 percent of the total outside surface of the core.

8. The chemical composition as recited in claim 1 wherein the shell covers in the range of from about 30 to 100 percent of the total outside surface of the core.

9. The chemical composition as recited in claim 1 wherein the shell is formed from $TiO_2$, and wherein the shell is attached to the core by a reaction product between the POH groups from the core and a material on the $TiO_2$.

10. The chemical composition as recited in claim 1 having an index of refraction that is greater than the core, and the core provides a controlled release of phosphate anion when placed into contact with moisture to provide a degree of anticorrosion protection.

11. The chemical composition as recited in claim 1 wherein the core absorbs up to 25 percent by weight water based on the weight of the core.

12. The chemical composition as recited in claim 1 wherein the core comprises a constituent incorporated therein, and wherein the constituent is released over time.

13. A chemical composition comprising:
    an aluminum phosphate composite material comprising:
    a plurality of core particles comprising amorphous aluminum phosphate extending throughout the core and occupying a central region of each respective core particle; and
    a shell disposed over at least about 20 percent of an outside surface area of respective core particles, the shells being formed from $TiO_2$; and
    a binding polymer, wherein the aluminum phosphate composite material is dispersed in the binding polymer;
    wherein the composite material comprises a chemical reaction product between the core and shell formed by reaction between pendant POH groups from the core and oxide groups on the shell, wherein the reaction product bonds together the core and shell.

14. The composition as recited in claim 13 further comprising a pigment material.

15. The composition as recited in claim 13 wherein the cores comprise crystalline aluminum phosphate.

16. The composition as recited in claim 13 wherein the shell covers about 30 to 100 percent of the surface area of a respective core.

17. The composition as recited in claim 13 wherein the core has an average particle size of less than about 30 microns.

18. The composition as recited in claim 13 wherein the core has an average particle size of between about 3 and 20 microns.

19. The composition as recited in claim 13 wherein the core provides a controlled release of phosphate anion of between about 50 to 1,500 ppm when exposed to moisture.

20. The composition as recited in claim 13 wherein the core absorbs up to about 25 percent by weight water when exposed to moisture based on the weight of the core.

21. The composition as recited in claim 13 wherein the core comprises a constituent material incorporated therein that is released in a controlled manner.

22. The composition as recited in claim 21 wherein the constituent material is a bioactive material.

23. The composition as recited in claim 21 wherein the constituent material is selected from the group consisting of Ag, Cu, Zn, Ca, Ni, Sr, and combinations thereof.

24. The composition as recited in claim 13 wherein the oxide groups are from an alumina material on the shell.

25. The composition as recited in claim 13 wherein the composite material has a shell thickness in the range of from about 0.001 to 2 microns.

26. A chemical composition comprising:
an aluminum phosphate composite material comprising:
  a plurality of core particles comprising amorphous aluminum phosphate extending throughout the core and occupying a central region of each respective core particle; and
  a shell disposed over at least about 20 percent of an outside surface area of respective core particles, the shells being formed from a pigment material; and
a binding polymer, wherein the aluminum phosphate composite material is dispersed in the binding polymer;
wherein the core particles comprise a constituent material incorporated therein that is released over time.

27. A coating composition comprising:
a binder polymer material; and
an aluminum phosphate composite material in the form of particles dispersed in the binder polymer material, wherein the aluminum phosphate composite material comprises:
  an aggregate of amorphous aluminum phosphate grains forming core particles, wherein the amorphous aluminum phosphate extends throughout the core particles and occupies a central region of the composite; and
  a shell disposed at least partially over an outside surface of a respective core particle, the shell being formed from a material having an index of refraction greater than the core particle;
wherein the composite material comprises a chemical reaction product formed between pendant POH groups of the core particles and oxide groups of respective shells bonding the core particles and respective shells together.

28. The coating composition as recited in claim 27 further comprising a pigment material.

29. The coating composition as recited in claim 28 wherein the aluminum phosphate composite material comprises at least 5 percent by weight of the total weight of the aluminum phosphate composite material and the pigment.

30. The coating composition as recited in claim 27 wherein the shell has an index of refraction that is greater than 2.

31. The coating composition as recited in claim 30 wherein the shell is formed from $TiO_2$.

32. The coating composition as recited in claim 31 wherein the chemical reaction product is formed between the pendant POH groups of the aluminum phosphate and the oxide groups of the $TiO_2$ shell.

33. The coating composition as recited in claim 27 wherein the shell has a thickness in the range of from about 0.001 to 2 microns.

34. The coating composition as recited in claim 27 wherein the shell covers at least 20 percent of the total outside surface of a respective shell.

* * * * *